United States Patent [19]

McGrath

[11] Patent Number: 4,648,178
[45] Date of Patent: Mar. 10, 1987

[54] BALLOON CLIP STAPLER DEVICE

[76] Inventor: John E. McGrath, 17743 April Ct., Castro Valley, Calif. 94546

[21] Appl. No.: 799,127

[22] Filed: Nov. 18, 1985

[51] Int. Cl.[4] ............................................. B23Q 7/10
[52] U.S. Cl. ...................................... 29/811; 29/235; 29/450; 53/138 A; 206/340
[58] Field of Search ................. 29/809, 235, 811, 451, 29/450; 206/340; 53/138 A, 583; 24/543

[56] References Cited

U.S. PATENT DOCUMENTS

| | | | |
|---|---|---|---|
| 2,055,440 | 9/1936 | Johns | 29/811 X |
| 2,715,731 | 8/1955 | Pugel | 29/811 X |
| 3,064,263 | 11/1962 | Powers | 29/811 X |
| 3,672,738 | 6/1972 | Buttriss | 29/811 X |
| 4,133,102 | 1/1979 | Gillemot | 29/811 X |
| 4,294,355 | 10/1981 | Jewusiak et al. | 206/340 X |
| 4,581,481 | 4/1986 | Moretti | 29/811 X |

Primary Examiner—Charlie T. Moon

Attorney, Agent, or Firm—Brumbaugh, Graves, Donohue & Raymond

[57] ABSTRACT

A device for clamping a tubular member such as the neck of a balloon in a clip having locking arms joined by a hinge comprising an open ended channel member for receiving a sequential chain of clips and a base member to which the channel member is secured, the base member being disposed to receive clips sequentially from the channel member and having a stop against which the lowermost clip in the chain is adapted to rest. Formed in the base member between said stop and the lower end of the channel member is a notch defined by cam surfaces leading to a narrow throat communicating with a larger opening. With a clip spanning the notch and resting against the stop, and the clip hinge facing the notch, a tubular member to be clamped is positioned in the interior portion of the hinge and forced downwardly with the clip through the throat of the notch, locking the arms of the clip with the tubular member clamped within the hinge, which may then be removed through the larger opening below the throat of the notch.

9 Claims, 5 Drawing Figures

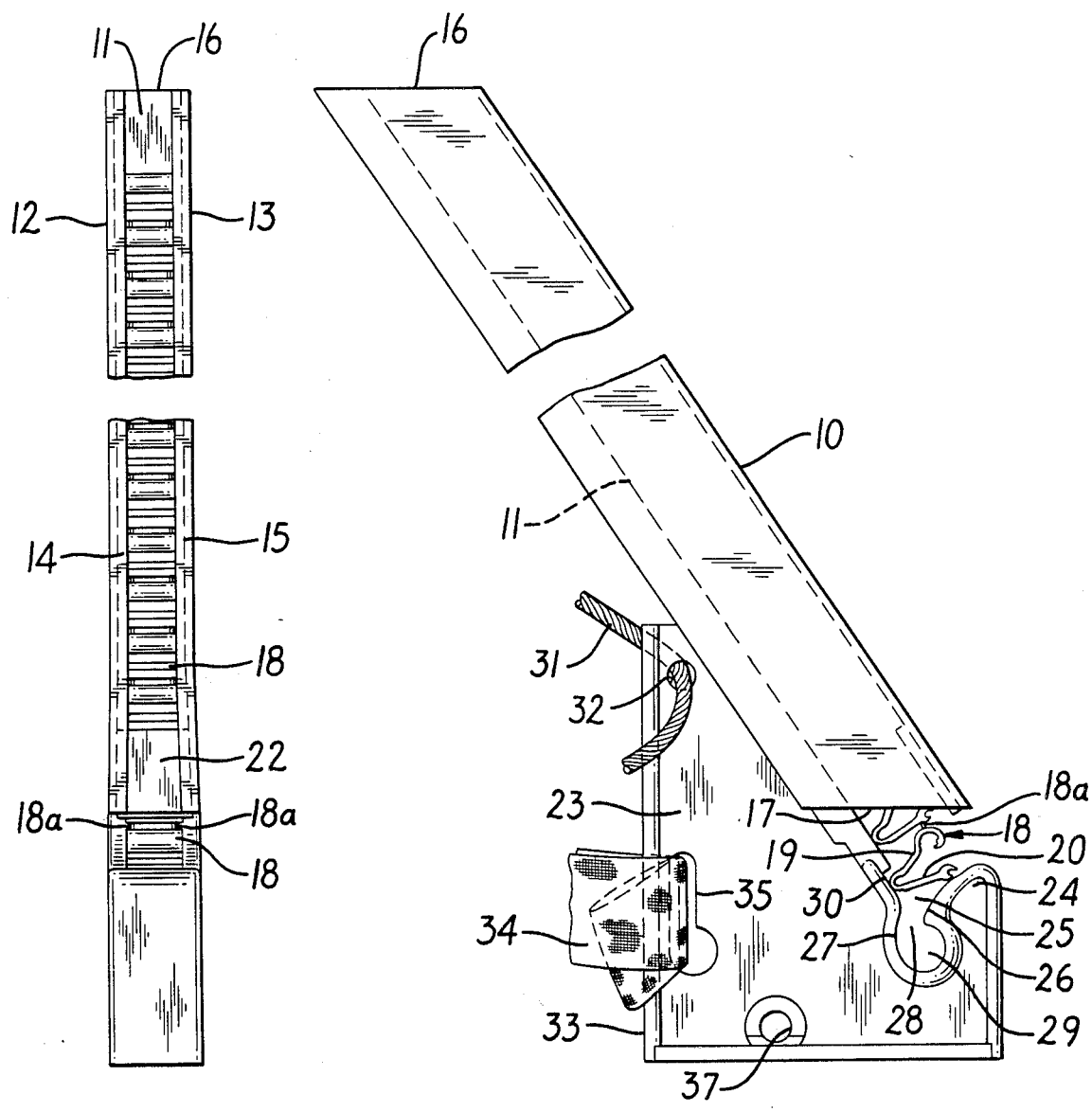
FIG. 1
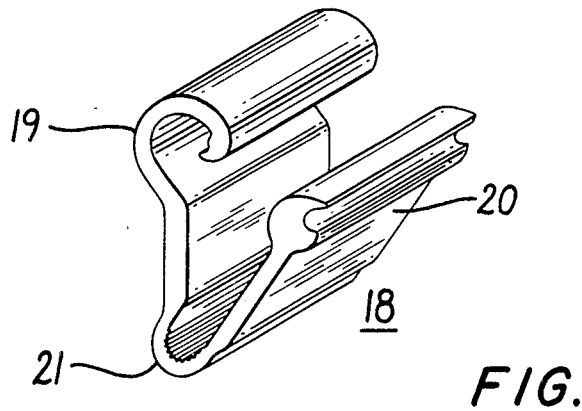
FIG. 2
FIG. 3

BALLOON CLIP STAPLER DEVICE

FIELD OF INVENTION

The present invention relates to devices for sealing objects such as balloons, flexible tubing and the like, and more specifically, to a stapler for holding and allowing easy application of such devices onto such objects.

BACKGROUND OF THE INVENTION

Sealing devices of various configurations are presently used to ensure a reliable seal on an object, such as a balloon, flexible tubing and the like. In one form, the device comprises a disc having a centrally located bore, which may be attached to the neck of a balloon or to a tube to pinch the latter tightly. Locking of discs onto many balloons can be burdensome and time-consuming, and staplers have been devised, as shown in U.S. Pat. Nos. 3,720,991 and 3,780,419 to R. L. Allison et al., that allow for easier application of the discs onto the object being sealed.

The preferred machine includes a sealing station to which successive discs, stored in a face-to-face relation on the loadable magazine having an elongated rod, are delivered automatically by a spring and by a feeding mechanism in the form of a stripper. To seal the balloon, the neck is stretched across the sealing station and placed in the hook of a power-driven needle, which is shifted inwardly to cause the hook to draw the neck forcibly through the hole in the disc, and thereby double over the neck and anchor the disc to the neck of the balloon.

The applicants herein have devised a balloon clip of unique design which is disclosed in U.S. Pat. No. 4,380,103. It has two arms with coacting locking means comprising C-shaped flanges which retain and seal an object within an interior clamping area. Staplers of the type shown in the Allison et al. patents are not usable with clips of this general character.

Accordingly, it is an object of the present invention to provide a clip stapler device of easy construction for manual use with balloon clips, preferably of the type disclosed in applicants' U.S. Pat. No. 4,380,103.

SUMMARY OF THE INVENTION

This and other objects are attained according to the invention by providing a balloon clip stapling device comprising a narrow channel member open at one end to receive a chain of clips, each of which has first and second clamping arms connected by an integral hinge, the interior of which defines a clamping area. The other end of the channel member is also open and is secured to a base member formed with a stop against which the lowermost clip in the chain is adapted to rest. Immediately below the hinge portion of the lowermost clip in the chain when at rest against the stop, a notch is formed in the base member. The surface of the stop and the adjacent rear wall of the notch are formed as cam surfaces leading to a narrow throat through which a clip is pulled in a clip-closing operation. Below the throat, the notch is enlarged to permit a closed clip to be readily removed from the device.

Sealing of an object such as an inflated balloon, for example, is effected by holding the neck at spaced apart locations, inserting the held neck portion into the interior hinge portion of the lowermost clip in the chain and sharply pulling the held neck portion down into the notch. This separates the clip from the chain, and as it passes through the throat of the notch, the clamping arms thereof are locked together, with the balloon neck securely clamped in the interior. The clamped balloon neck can then easily be removed from the device through the enlarged portion of the notch below the throat.

BRIEF DESCRIPTION OF THE DRAWINGS

The invention may be better understood from the following detailed description, taken in conjunction with the accompanying drawings, in which:

FIG. 1 is a side view of a clip stapling device constructed according to the invention, loaded with a chain of clips to be stapled;

FIG. 2 is a front view of the clip stapling device shown in FIG. 1;

FIG. 3 is an enlarged view in perspective of one of the clips with which the stapling device of FIG. 1 is adapted to be used;

DETAILED DESCRIPTION OF THE DRAWINGS

Figure 4:
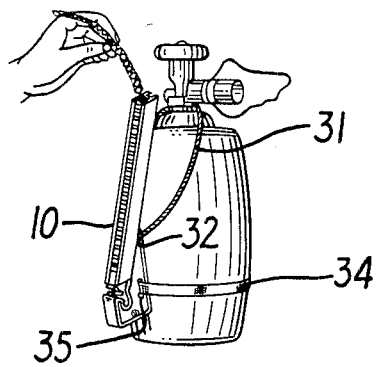
FIG. 4 illustrates how the stapling device of FIG. 1 may be secured to a support such as a tank of gas.

While this invention is susceptible of embodiment in many different forms, there is shown in the drawings and will herein be described in detail one specific embodiment, with the understanding that the present disclosure is to be considered as an example of the principles of the invention and is not intended to limit the invention to the embodiment illustrated.

In the embodiment shown in FIGS. 1 and 2, the balloon clip stapler device comprises a channel member 10 having a bottom 11 and sides 12 and 13, having inwardly extending flanges 14 and 15 at the upper ends thereof.

The channel member 10 has open top and bottom ends 16 and 17 and is shaped to accommodate a quantity of clips of the type described in applicants' U.S. Pat. No. 4,380,103, preferably in the form of a chain in which adjacent clips 18 are secured to one another by fragile links 18a, for example. As shown in FIG. 3, the clips 18 are each formed with first and second clamping arms 19 and 20 connected by an integral hinge 21, the interior of which defines a clamping area. A spacer 22 may be secured to the flanges 14 and 15 to maintain a predetermined spacing between the sides 12 and 13 at the open bottom end 17 of the channel member 10. The spacer 22 also serves to reduce the height of the chamber member 10 so as to restrict rotation of the clips and facilitate breaking them off in the clip locking operation described below.

The channel member 10 is secured to a base member 23 formed with a stop 24 against which the lowermost clip 18 in the chain is adapted to rest. Between the bottom end 17 of the channel member and the stop 24, a notch 25 is formed in the base member 23. The surface 26 of the stop 24 and the opposing surface 27 of the notch are formed as cam surfaces leading downwardly to a narrow throat 28 through which a clip is pulled in a clip closing operation. The surface 27 continues along an arcuate path to the lower end of the cam surface 26 on the stop 24, forming an opening 29 of suitable size and shape to facilitate removal of a clipped object from the device. A step 30 may be formed adjacent the notch 25 to serve as a stop to retain lowermost clip 18 in position, with preferably the shorter clamping arm 20 over the notch 25.

The clip stapling device of the invention may conveniently be attached to a tank of helium of the kind often used to fill and seal inflatable balloons. To this end, a cable loop 31 may be inserted through a hole 32 formed in the base member 23. The cable loop 31 should be of sufficient length that when it is slipped around the base of the pipe at the top of the tank, the straight side 33 of the base member 23 rests against the side of the tank, as shown in FIG. 4. Means such as an adjustable strap 34 is passed through a slot 35 in the base member 23 and around the tank and fastened tightly enough to keep the device from sliding sideways in use.

In operation, the device is loaded by introducing a quantity of clips 18, preferably in the form of a chain, into the open top end 16 of the channel member 10. The clips preferably should be inserted with the hinge 21 down and the shorter clamping arm 20 forward. The clips 18 will slide down the channel member 10 and the lowermost one will come to rest with the clamping arm 20 lying over the notch 25 and its outer end engaging the stop 24. Sealing of an inflated balloon, for example, is accomplished by grasping the neck with two hands at spaced apart locations, inserting the portion of the neck between the two locations into the hinge portion 21 of the clip 18 so that it straddles the base member, and pulling down on both sides to shear off the clip and force it through the throat 28. This causes the clamping arms 19 and 20 to be moved together by the cam surfaces 26 and 27 to the locked position, sealing the balloon, which then can easily be removed through the opening 29. Desirably, the links 18A should be designed to break with greater force than that required to urge the clamping arms to the locked positions in a clip closing operation so that the links are broken and the clipping arms move to the locked position in one smooth continuous operation by the user. Further, the links 18A should preferably be designed to break more easily upon being bent downwardly than upon being pulled longitudinally in the direction of the length of the chain of clips.

Figure 5:
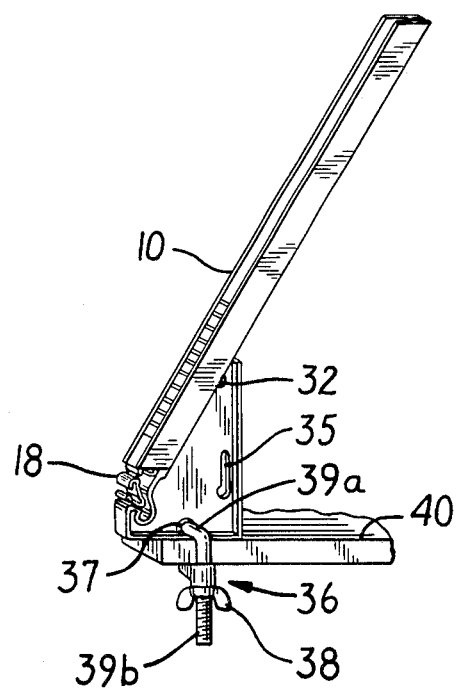
FIG. 5 illustrates how the stapling device of FIG. 1 may be secured to a support such as a table.

The clip stapler of the invention can have attached thereto means such as an elongated hook, for example, to allow the user to reopen the clip. Also, the device can, of course, be mounted on any flat support such as a table, for example, as shown in FIG. 5. This requires only that one arm 39a of an L-bolt clamp 36 be inserted into a hole 37 in the base member 23, and that a nut 38 threaded on the other arm 39b be tightened down to secure the device to a table 40 or other support. Other ways of mounting the device will be readily apparent to those skilled in the art.

Although the invention has been described and illustrated herein by reference to a specific embodiment thereof, it will be understood that such embodiment is susceptible to variation and modification without departing from the inventive concepts disclosed. All such variations and modifications, therefore, are intended to be included within the spirit and scope of the appended claims.

I claim:

1. A device for clamping off a tubular member such as the neck of a balloon with a clip having locking arms joined by a hinge, comprising a hollow channel member open at the opposite ends thereof and shaped to accommodate a chain of said clips therein, a base member secured to said channel member at one end thereof, said base member having a surface for receiving clips fed out of said one end of the channel member and a stop for said clips, and means forming a notch in said base member surface between said stop and said one end of the channel member, said notch being shaped to urge the clamping arms of a clip to the locked position when moved therethrough with the hinge thereof facing the notch.

2. A clamping device as in claim 1 in which the channel member is inclined with respect to the base member to facilitate gravity feed of clips contained therein and said notch is defined by cam surfaces on the base member leading to a narrow throat through which a clip is adapted to be moved.

3. A clamping device as in claim 2 in which said notch is enlarged below said throat to facilitate removal of a clamped object therefrom upon completion of a clamping operation.

4. A clamping device as in claim 3 in which said base member is formed with a surface shaped to conform to the surface of a support such as a tank of gas for filling balloons or the like, and means is provided for securing the device releasably to said support with said surfaces in engaged relation.

5. A clamping device as in claim 4 in which said securing means includes a cable for suspending the device from the neck of a tank of gas or the like, and strap means adapted to secure the base member to the body of the tank.

6. A clamping device as in claim 3 in which said base member is formed with a surface adapted to conform to the surface of a support and means is provided for mounting said base member on the support.

7. A clamping device as in claim 1 together with a chain of clips in said channel member, each of said clips comprising first and second arms having interior and exterior surfaces and coacting locking means on extending ends thereof, said first and second arms being connected by an integral hinge and said second arm locking means being slightly larger than said first arm locking means, and linking means connecting each of said clips to an adjacent clip so that said exterior surface of said first arm of one clip is connected to said exterior surface of said second arm of an adjacent clip at the ends of said arms away from said integral hinge.

8. A clamping device as in claim 7 wherein said chain of clips is positioned in said channel member such that the lowermost clip thereof rests against said stop with the hinge thereof facing the notch, whereby when the clip is moved through the notch it is urged into the locked position in one smooth continuous motion.

9. A clamping device as in claim 7 wherein said channel member includes two sides having flanges to which is secured a spacer adapted to maintain a predetermined spacing between said sides at said bottom end of said member, and to set the height of said chamber at the lower open end thereof to restrict movement of the next to the lowermost clip in the chain when the lowermost clip is being moved through the notch.

* * * * *

UNITED STATES PATENT AND TRADEMARK OFFICE
CERTIFICATE OF CORRECTION

PATENT NO. : 4,648,178
DATED : March 10, 1987
INVENTOR(S) : John E. McGrath

It is certified that error appears in the above—identified patent and that said Letters Patent is hereby corrected as shown below:

<u>First Page, Item 56</u>, the following references should be added:

| | | | |
|---|---|---|---|
| 4,380,103 | 4/83 | McGrath et al. | 24/543 |
| 3,720,991 | 3/73 | Allison et al. | 29/709 |
| 3,780,419 | 12/73 | Allison et al. | 29/451 |
| 3,370,396 | 2/68 | Paxton et al. | 53/138A |
| 3,021,654 | 2/62 | G.R. Harris | 53/138A |
| Re. 28,170 | 9/74 | Lehmann | 53/583 |
| 2,972,747 | 2/61 | Kelem | 29/566 |
| 1,205,219 | 11/16 | Kennedy | 29/809 |
| 1,077,154 | 10/13 | Mullally et al. | 29/809 |

Signed and Sealed this

Twenty-second Day of September, 1987

Attest:

DONALD J. QUIGG

Attesting Officer     Commissioner of Patents and Trademarks